United States Patent [19]

Zimmermann et al.

[11] Patent Number: 4,619,788
[45] Date of Patent: Oct. 28, 1986

[54] PYRAMIDAL LIQUID CRYSTALS

[75] Inventors: Herbert Zimmermann, Schriesheim, Fed. Rep. of Germany; Raphi Poupko; Zeev Luz, both of Rehovot, Israel; Jean Billard, Paris, France

[73] Assignee: Max-Planck-Gesellschaft zur Foerderung der Wissenschaften E.V., Goettingen, Fed. Rep. of Germany

[21] Appl. No.: 788,813

[22] Filed: Oct. 18, 1985

[30] Foreign Application Priority Data

Oct. 19, 1984 [DE] Fed. Rep. of Germany ....... 3438424

[51] Int. Cl.⁴ .......................... C11C 3/00; C07C 43/21; C07C 69/773; G02F 1/13
[52] U.S. Cl. ............................. 260/410.5; 252/299.62; 350/350 R; 560/61; 560/73; 568/633
[58] Field of Search .................... 568/633; 560/73, 61; 260/410.5

[56] References Cited

U.S. PATENT DOCUMENTS

| | | | |
|---|---|---|---|
| 4,002,670 | 1/1977 | Steinstrasser | 560/73 |
| 4,112,239 | 9/1978 | Dubois et al. | 560/73 |
| 4,195,916 | 4/1980 | Coates et al. | 560/73 |
| 4,216,109 | 8/1980 | Mizukuchi | 560/73 |
| 4,333,709 | 6/1982 | Dubois et al. | 350/350 R |
| 4,368,135 | 1/1983 | Osman | 560/73 |
| 4,402,855 | 9/1983 | Zann et al. | 560/73 |
| 4,406,814 | 9/1983 | Ferrato | 560/73 |
| 4,430,650 | 2/1984 | Billard et al. | 340/784 |

FOREIGN PATENT DOCUMENTS 134576  3/1985  European Pat. Off. .

OTHER PUBLICATIONS

Chemical Abstracts: vol. 59, No. 2, Jul. 22, 1963.
Chemical Abstracts: vol. 62, No. 11, May 24, 1965.
Chemical Abstracts: vol. 95, No. 15, Oct. 12, 1981.
Chemical Abstracts: vol. 88, No. 25, Jun. 19, 1978.
Chemical Abstracts: vol. 87, No. 7, Aug. 15, 1977.

*Primary Examiner*—J. E. Evans
*Attorney, Agent, or Firm*—Kenyon & Kenyon

[57] ABSTRACT

The invention relates to hexa-substituted tribenzocyclononatriene derivatives constituting a new type of liquid crystals with novel "pyramidal" mesophases. The compounds of the invention differ from the known liquid crystals in their different steric molecular structure. Their molecules consist of a rigid central nucleus of pyramidal structure, the chains of substituents being symmetrically attached to the basis of the pyramid. The compounds of the invention have an electric dipole moment and can be excited in the electric field. Therefore, they are suitable for use in memory devices and/or electro-optical display means.

10 Claims, 7 Drawing Figures

Phase diagram of the binary mixtures of $C_6$-hexaalkoxy and $C_7$-hexaalkoxy derivatives: Complete miscibility of the two components in the isotropic and pyramidal phases. The solubility of the pure solid component (xxx) is calculated.

I = isotropic phase      P = pyramidal mesophase

Phase diagram of the binary mixtures of $C_{12}$- and $C_{11}$-hexaalkoxy derivatives: Complete miscibility of the two components in the isotropic and pyramidal phase $P_2$. Component $C_{12}$ has no stable $P_1$-mesophase. The eutectic temperature observed is 31°C and is in line wiht the value calculated.

Phase diagram of the binary mixtures of $C_{11}COO$ and $C_{12}COO$-alkanoyloxy derivatives: Complete miscibility of the two components in the isotropic phase and the pyramidal phases $P_2$ and $P_3$.

Phase diagram of the binary mixtures of $C_{12}COO-$ and $C_{13}COO-$ alkanoyloxy derivatives: Complete miscibility in the isotropic and pyramidal mesophases $P_2$ and $P_3$.

PYRAMIDAL LIQUID CRYSTALS

The invention relates to compounds representing a new type of liquid crystals with completely novel "pyramidal" mesophases. The compounds of the invention differ from the known liquid crystals by a different steric structure of the molecules. The molecules consist of a rigid central nucleus with pyramidal formation, the chains of substituents being symmetrically attached to the basis of the pyramid. The compounds of the invention have an electric dipole moment and can be excited in the electrical field and are therefore suitable for use in memory devices and/or electro-optical display means. They are termed pyramidal liquid crystals.

Liquid crystalline phases and the possibility to use them as electronic components, for instance in the field of electro-optics, in the examination of materials without destroying these materials, in analysis and medical diagnostics, have been known for quite some time. Because of their optical, rheological and thermodynamic properties, the smectic, nematic and chlolesteric liquid crystalline phases can be easily distinguished from each other. These classical liquid crystals are mostly composed of elongated molecules which under certain physical conditions show a regular arrangement. A synopsis regarding structure and properties of liquid crystalline phases and their possible uses is given in Ullmanns Enzyklopädie der technischen Chemie, 4th edition, (1976), volume 11, pages 657–671.

A new type of liquid crystals which differ in their molecular structure from the so far known liquid crystalline phases of elongated molecules are the so-called discotic liquid crystals, see for instance J. Billard et al., Nouveau Journal de Chimie, vol. 2 (1978), pages 535–540. These liquid crystals consist of flat, disc-like molecules with a central, unsaturated nucleus, to the rim of which alkyl, alkanoyl, alkylbenzoyl or alkoxybenzoyl chains are attached. Examples of aromatic nuclei are benzene, triphenylene and truxene. The substituents (usually 6 in number) are attached to the nucleus mostly via oxygen bridges, i.e. ether or ester bonds.

U.S. Pat. No. 4,333,709 describes a mixture of liquid crystals with a nematic mesophase which essentially consists of a mixture of hexa-substituted triphenylene derivatives with disc-like molecular structure. These mixtures are said to react to an electric field and to lend themselves therefore to application in electro-optical display means.

U.S. Pat. No. 4,430,650 discloses a display method with information memory which uses specific disc-like liquid crystals. They are locally heated on both sides of the transition temperature between two mesophases and are then quickly cooled down, which permits the liquid crystal to become diffused with an adequate contrast to be used for display purposes.

The liquid crystals used are flat, disc-like triphenylene derivatives of the formula

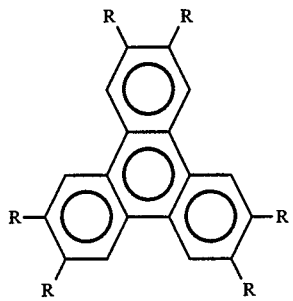

wherein R means

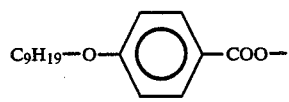

and

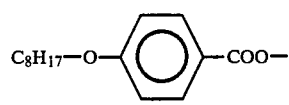

Because of their flat molecular structure, the known discotic liquid crystals show at the most a small electric dipole moment and therefore do not, or hardly ever orientate themselves in the electric field. Moreover, their mesomorphic transition temperatures are relatively high, whereby their practical uses are further restricted.

It is the object of the invention to provide compounds exhibiting a new class of mesophases, i.e. molecules which are formed in the liquid crystalline phase in columnar shapes and exhibit a polar molecular structure with anisotrophy.

This object is achieved by the invention.

Consequently, the invention relates to hexa-substituted tribenzocyclononatriene derivatives of general formula I

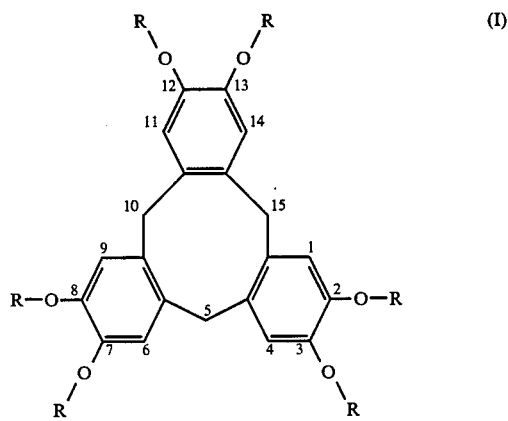

in which the residues R are the same or different and independently from each other are alkyl groups having at least 6 carbon atoms, alkanoyl groups having at least 10 carbon atoms or p-alkylbenzoyl or p-alkoxybenzoyl groups of the formula

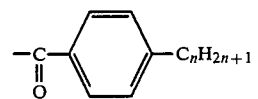

or

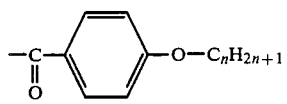

in which n is an integer of at least 5.

The compounds of the invention can be called hexa-substituted tribenzocyclononatrienes (2,3,7,8,12,13-hexasubstituted 5,10,15-trihydro-tribenzo[a,d,g]-cyclononatriene).

Of the compounds of general formula I, those in which the residues R each have the same meaning are preferred. Moreover, those compounds of general formula I are preferred, in which the residues R are alkyl groups having 6 to 18 carbon atoms or alkanoyl groups with 10 to 18 carbon atoms and the alkoxybenzoyl and alkyl benzoyl derivatives of general formula I, in which n is not greater than 18, and in particular is from 6 to 14.

The hexaalkoxytribenzocyclononatrienes of general formula Ia are prepared by reacting hexahydroxytribenzocyclononatriene of general formula II with a corresponding n-alkylbromide according to the following reaction scheme

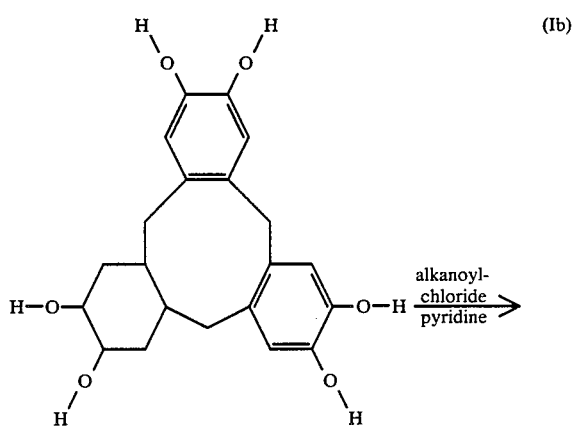

(Ia)

R = alkyl

Advantageously, the reaction is carried out while the reaction mixture is heated, for instance at reflux temperature. The reactants may be used in stoichiometric amounts; however, an excess of the alkyl halide, for instance a 2 to 10 fold excess is preferred. The reaction can be carried out in a solvent, such as ethanol or n-butanol. The addition of an acid-binding agent, such as $K_2CO_3$, $Cs_2CO_3$ or NaOH promotes reaction. Moreover, these compounds are obtainable by reacting II with an alkyl halide in THF/NaH in the presence of a crown ether.

The hexaalkanoyloxytribenzocyclononatrienes of general formula Ib (including the alkylbenzoyl and alkoxybenzoylderivatives) can be obtained by reacting hexahydroxytribenzocyclononatriene of general formula II with the corresponding acid halide. This reaction is carried out under esterification conditions, for instance at reflux temperature. Preferably, the corresponding acid chloride is used as acid halide. In another embodiment, the acid chloride is slowly added to a solution of the hexahydroxytribenzocyclononatriene in a solvent, such as pyridine, at low temperature, for instance at about 0° C. The reaction mixture is then stirred for several hours until reaction is completed.

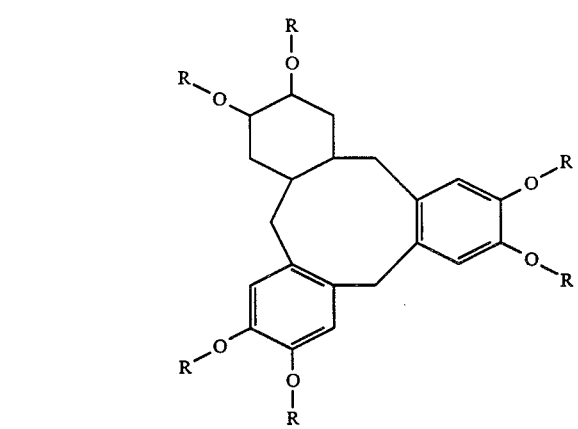

(Ib)

R = alkanoyl or benzoyl

The hexahydroxytribenzocyclononatriene of general formula II used as starting compound can be obtained by hydrolyzing hexamethoxytribenzocyclononatriene of general formula III which is known as cycloveratrylene and can easily be obtained by reacting formaldehyde with 1,2-dimethoxybenzene (veratrol) in the presence of a strong acid. Thus the starting compound is prepared according to the following reaction scheme:

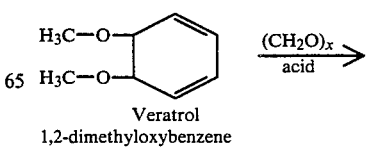

Veratrol
1,2-dimethyloxybenzene

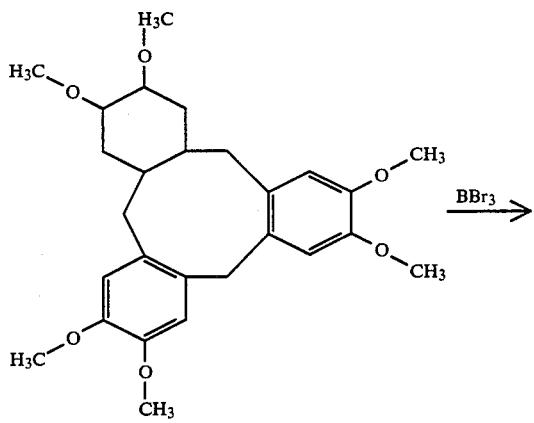

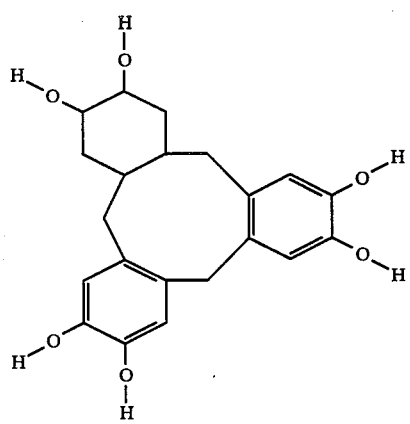

An alternative manufacturing process would be the condensation of 1,2-dialkoxybenzenes with paraformaldehyde. 1,2-dialkoxybenzenes can conveniently be obtained by alkylation of 1,2-dihydroxybenzene (catechol, pyrocatechin). If 1,2-dialkoxybenzene having 6 to 18 carbon atoms in the alkyl chain are used, then the corresponding pyramidal liquid crystals can be obtained in one reaction step.

Moreover, the hexaalkoxytribenzocyclononatrienes are obtainable by condensation from the corresponding 3,4-dialkoxybenzyl alcohols or 3,4-dialkoxybenzylchlorides or bromides by reaction with paraformaldehyde under acidic conditions. These reactions can be represented by the following formulae:

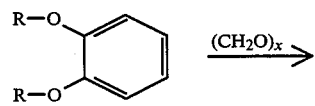

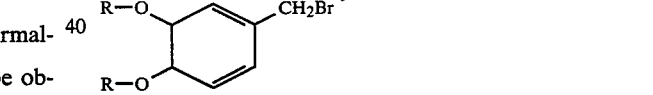

Both the alkoxy and alkanoyloxy derivatives of general formula 1 have a mesophase, that is a liquid crystalline state, only if the side chains in the respective series of compounds are sufficiently long. By contrast, the derivatives with shorter chains, i.e. the $C_{1-5}$-alkoxy and the $C_{1-8}$-alkanoyloxy derivatives are solids without stable mesophase. Only if the side chains are sufficiently long, are stable mesophases formed; see FIG. 1 for the alkoxy derivatives and FIG. 2 for the alkanoyloxy derivatives.

The compounds of the invention contain a carbon ring system consisting of a cyclononatriene ring with three benzene rings condensed onto it, the benzene rings are separate from each other and carry the alkoxy or alkanoyloxy substituents. The compounds have the steric structure of a crown conformation; see FIG. 3. Consequently, the molecular structure is pyramidal. The aromatic rings form the three sides of the pyramid, the substituents being located at its basis. The new liquid crystalline compounds of the invention thus have a pyramidal configuration instead of the flat central part of the discotic compounds and show different novel "pyramidal" mesophases. Because of their crown conformation, the compounds of the invention are polar with an electric dipole moment.

In the liquid crystalline state, the compounds of the invention arrange themselves like hats on top of each other, resulting in a columnar structure. These molecule columns, in turn, arrange themselves in parallel, side by side. The curvature of the molecules in the columnar structure may be positive or negative relative to the axis of stacking. Some of the mesophases are optically monoaxial. Defects with linear axis are observed. This is an indication of the molecules being arranged in parallel columns. From the dipole moment of these molecule columns there results a dipole moment in the pyramidal mesophases.

If during the formation of pyramidal mesophases (by cooling the isotropic phase) an electric field is applied, it is possible to obtain polarized mesophases. This way, said novel pyramidal mesophases show a so-called "memory effect" as described in U.S. Pat. No. 4,430,650. However, in the compounds of the invention with their pyramidal molecules connected in series and the resulting summation of the dipole moments in the direction of the longitudinal axis of the columns, the "memory effect" is considerable greater than in the known discotic mesophases with flat molecules. If the region of the phase transition (mesophase-mesophase or mesophase-isotropic phase) is heated locally for a short time, for instance with an IR laser, while at the same time an outer electric field of different orientation is applied, then under the influence of the electric field, the molecules in these local regions receive an orientation different from that of their surroundings, and as a result a liquid crystal with a "pattern" is formed.

The transition temperatures of a number of compounds of the alkoxy and alkanoyloxy derivatives of general formula I are compiled in Tables I, II and III and shown as graphs in FIGS. 1 and 2. In both types of derivatives, the occurrence of the liquid crystalline mesophases depends on the length of the side chains bound to the central ring unit.

In compounds of the type R=alkyl benozyl (n=5-18) the (plus/minus) sign of the optical anisotropy is changed during cooling and heating of the mesophase. At a specific temperature the birefrigerence passes the value of zero. The mentioned change in the signs during heating or cooling is completely reversible. After cooling from the isotropic phase, the mesophase normally has a negative sign, while the low temperature phase usually is positive.

This property enables the use of the mentioned compounds as liquid-crystalline thermooptical switches; therefore, the compounds are also suitable for use in memory devices and/or electro-optical display means.

All mesophases of the alkoxy-type compounds are continuously miscible with each other. The mesophases of the alkanoyl-type compounds are likewise continuously miscible with each other. Phase diagrams of selected mixtures are shown in FIGS. 4 to 7.

The examples illustrate the invention.

EXAMPLE 1

Hexahexyloxytribenzocyclononatriene 0.5 g of hexahydroxytribenzocyclononatriene are heated in 50 ml of 95% ethanol and 6 g of $K_2CO_3$ for 30 minutes under reflux. 6 g of n-hexylbromide in 20 ml of dimethylformamide (5 fold excess) are then added and the mixture is heated under reflux for 24 hours and stirred. Subsequently, the reaction product is filtered while hot and then the solvent, the excess n-hexylbromide and dimethyl formamide are distilled off under reduced pressure. The product obtained is purified by column chromatography in silica gel with a mixture of $CHCl_3$ and n-hexane as eluate. Hexahexyloxytribenzocyclononatriene is obtained in a yield of 0.9 g (74%).

The NMR spectrum shows the rigid crown conformation with three exactly equivalent pairs of axial and equatorial hydrogen atoms and one single aromatic resonance because of the equivalence of the six aromatic protons.

NMR spectrum 0.89 ppm (t;J=6.8 Hz; 18H—$CH_3$), 1.1-1.6 ppm (m; 36H—$CH_2$—$CH_2$—$CH_2$ $_2$—$C\overline{H}_3$), 1.60-1.80 ppm (m; 12H—O—$\overline{C}H_2$—$\overline{C}H_2$), 3.49 ppm (d; J=14.7 Hz, Ar—$CH_2$—Ar equ.) 3.85-4.0 ppm (m; 12H, —O—$CH_2$), 4.70 ppm (d; J=14.7 Hz Ar—$C\underline{H}_2$—ax-—Ar), 6.82 (S; 12H $H_{arom.}$)

Analysis for $C_{57}H_{90}O_6$: Calculated: C=78.57% H=10.41%. Found: C=78.83% H=10.61%.

Thin layer chromatogram (silica gel/$CDCl_3$/n-hexane): One single stain.

EXAMPLES 2 TO 7

The process of example 1 is repeated using n-$C_{7-12}$-alkylbromide instead of n-hexylbromide to prepare the corresponding hexa-$C_{7-12}$-alkoxytribenzocyclononatrienes. The higher homologs are recrystallized from ethanol twice and are then chromatographically purified, while the lower homologs are purified directly according to example 1 by column chromatography. The transition temperatures of the pyramidal mesophases of the compounds obtained are compiled in Table I and graphically represented in FIG. 1.

EXAMPLE 8

Hexatridecanoyloxytribenzocyclononatriene 1 g of hexahydroxytribenzocyclononatriene and 25 ml of n-tridecanoylchloride are heated at 185° C. for 5 hours and stirred. The excess acid chloride is then removed by distillation under reduced pressure ($10^{-2}$ torr) and the residue obtained is recrystallized twice from ethanol.

The product is then purified by column chromatography in silica gel with methylene chloride as eluate. Hexatridecanoyloxytribenzocyclononatriene is obtained in a yield of 2.5 g (58%).

Analysis for $C_{99}H_{162}O_{12}$: Calculated: C=76.99% H=10.57%. Found: C=77.20% H=10.84%.

EXAMPLE 9

Hexapentadecanoyloxytribenzocyclononatriene 0.5 g of hexahydroxytribenzocyclononatriene are dissolved in 46 ml of anhydrous pyridine. 8.2 g of pentadecanoylchloride are added slowly while the mixture is cooled and stirred. Stirring is continued for 10 more hours at 0° C. and for 24 hours at room temperature. Subsequently, the mixture is poured into excess dilute hydrochloric acid. The precipitated solid is filtered off and recrystallized from ethanol twice. The hexapentadecanoyloxytribenzocyclononatriene is obtained in a yield of 1.6 g (67%) and is purified by column chromatography in silica gel with methylene chloride as eluate.

Analysis for $C_{111}H_{186}O_{12}$: Calculated: C=77.84% H=11.94%. Found: C=77.91% H=10.90%.

EXAMPLES 10 TO 13

The process of example 8 or 9 is repeated using the corresponding $C_{10-12}$- or $C_{14}$-alkanoylchlorides instead of tridecanoylchloride or pentadecanoylchloride to obtain the corresponding hexa-$C_{10-12}$- or $C_{13}$-alkanoyloxytribenzocyclononatrienes. The transition temperatures of the pyramidal mesophases of these compounds are compiled in Table II and graphically represented in FIG. 2.

EXAMPLE 14

Hexa-n-decyloxybenzoyloxytribenzocyclononatriene 0.5 g of hexahydroxytribenzocyclononatriene in 30 ml anhydrous pyridine are stirred together with 7 g of n-decyloxybenzoylchloride at 0° C. for 3 days as in example 9. After the pyridine is distilled off under reduced pressure and after separation of Py.HCl the compound is placed in $CH_2Cl_2$, extracted with 2 n HCl and purified by column chromatography in $Al_2O_3$ with $CH_2Cl_2$ as eluate.

EXAMPLES 15 AND 16

The process described in example 14 is repeated using p-octylbenzoylchloride and p-decylbenzoylchloride, respectively, instead of decyloxybenzoylchloride to obtain the corresponding hexa-p-octyl and hexa-p-decylbenzoyloxytribenzocyclononatrienes. The transition temperatures of the pyramidal mesophases of these compounds are compiled in Table III.

TABLE I

Transition temperatures (°C.), enthalpies (KJ/mole in brackets) of hexaalkyloxytribenzocyclononatriene derivatives
$R = n-C_mH_{2m-1}-O-$

| m | $K_1$ | | $K_2$ | | $P_1$ | | $P_2$ | | I |
|---|---|---|---|---|---|---|---|---|---|
| 4 | • | | | | | | 135.6 (22.1) | • | • |
| 5 | • | | 68.4 (21.7) | • | | | 103.8 (16.0) | • | • |
| 6 | • | | 40.9 (15.7) | | | • | 92.2 (14.4) | • | • |
| 7 | • | | 25.0 (21.1) | | | • | 79.9 (9.3) | • | • |
| 8 | • | | 24.9 (24.8) | | | • | 71.5 (6.9) | • | • |
| 9 | • | | 18.7 (28.6) | | | • | 66.1 (6.9) | • | • |
| 10 | • | | 25.5 (40.4) | | | • | 61.6 (5.7) | • | • |
| 11 | • | | 34.8 (51.7) | • | | 44.2 (7.2) | • | 63.5 (5.7) | • | • |
| 12 | • | | 48.3 (76.0) | | | | 61.6 (6.2) | • | • |

$P_1, P_2$ = pyramidal liquid crystalline phases
$K_1$ = crystalline phases
$K_2$ = crystalline phases
I = isotropic phase

TABLE II

Transition temperatures (°C.), enthalpies (KJ/mole in brackets) of hexaalkanoyloxytribenzocyclononatriene derivatives $R = n-C_{m-1}H_{2m-1}-\underset{\underset{O}{\|}}{C}-O-$

| m | $K_1$ | | $P_1$ | | $P_2$ | | $P_3$ | | I |
|---|---|---|---|---|---|---|---|---|---|
| 8 | • | | | | | | | | 153.1 (31.0) • |
| 9 | • | | | | | | | | 152.6 (30.2) • |
| 10 | • | 18.2 (22.1) | • | 32.7 (14.8) | • | | | | 146.2 (29.2) • |
| 11 | • | 31.5 (22.0) | • | 38.6 (17.3) | • | 131.6 (3.7) | • | | 140.8 (18.8) • |
| 12 | • | 58.1 (48.4) | | | • | 118.8 (3.1) | • | | 140.6 (20.2) • |
| 13 | • | 67.4 | | | • | 99.5 | • | | 139.2 • |

TABLE II-continued

Transition temperatures (°C.), enthalpies (KJ/mole in brackets) of hexaalkanoyloxytribenzocyclononatriene derivatives $R = n-C_{m-1}H_{2m-1}-\underset{\underset{O}{\|}}{C}-O-$

| m | $K_1$ | | $P_1$ | | $P_2$ | | $P_3$ | | I |
|---|---|---|---|---|---|---|---|---|---|
| 14 | • | (67.0) 73.4 (81.0) | | | • | 81.4 (1.4) | • | (2.3) 136.2 (18.5) | • | (20.9) • |
| 15 | • | 80.5 (118.4) | | | | | | • | 134.6 (19.1) | • |

$P_1, P_2, P_3$ = pyramidal liquid crystalline phases that are different from each other
K = crystalline phase
I = isotropic phase

TABLE III $R = -\underset{\underset{O}{\|}}{C}-\langle\text{phenyl}\rangle-C_nH_{2n+1}$    n = 8

| n | cryst. | | pyram. mesophase | | isotropic |
|---|---|---|---|---|---|
| 8 | • | 17° C. | • | 156° C. | • |
| 10 | • | 42° C. | • | 162° C. | • |

$R = -\underset{\underset{O}{\|}}{C}-\langle\text{phenyl}\rangle-O-C_nH_{2n+1}$    n = 10

| n | | pyram. mesophase | | isotropic |
|---|---|---|---|---|
| 10 | • | | • | 191° C. • |

Figure 1:
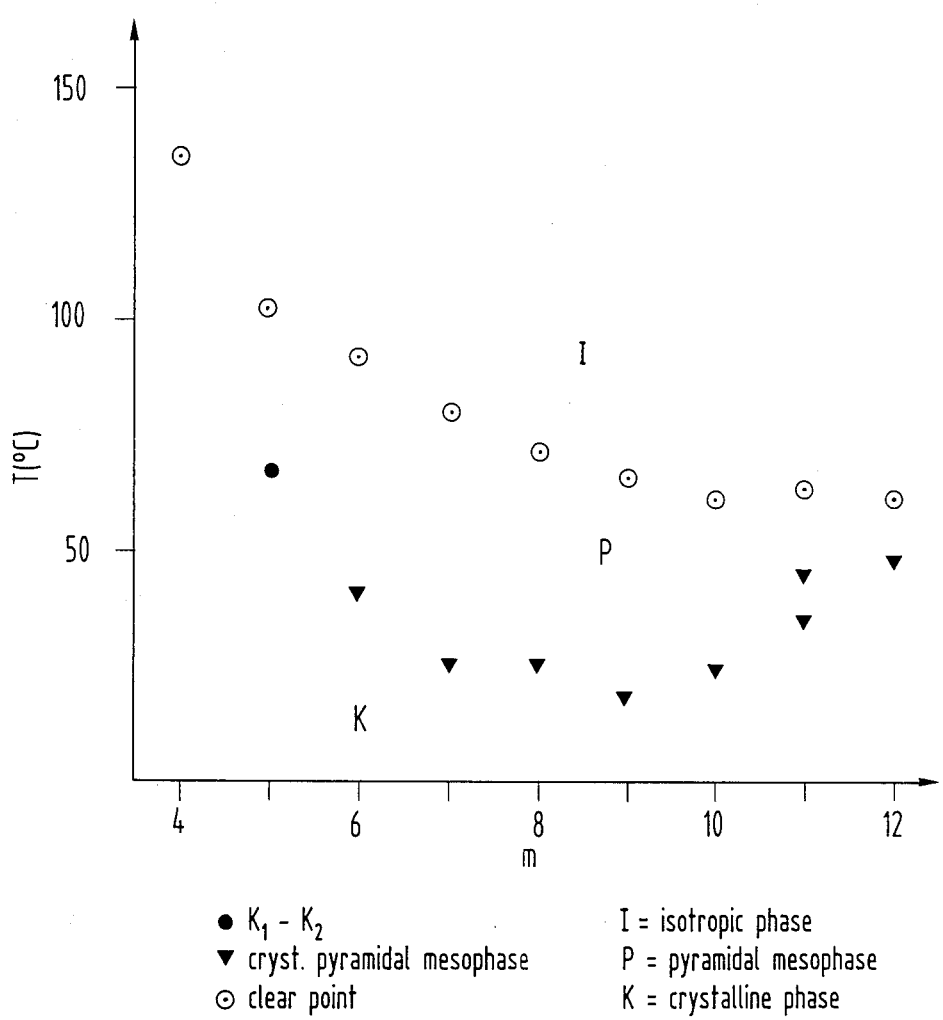
FIGS. 1 and 2 show the tranformational temperatures of the instant hexa alkoxy and hexa alkanoyloxy derivatives, respectively.
Figure 2:
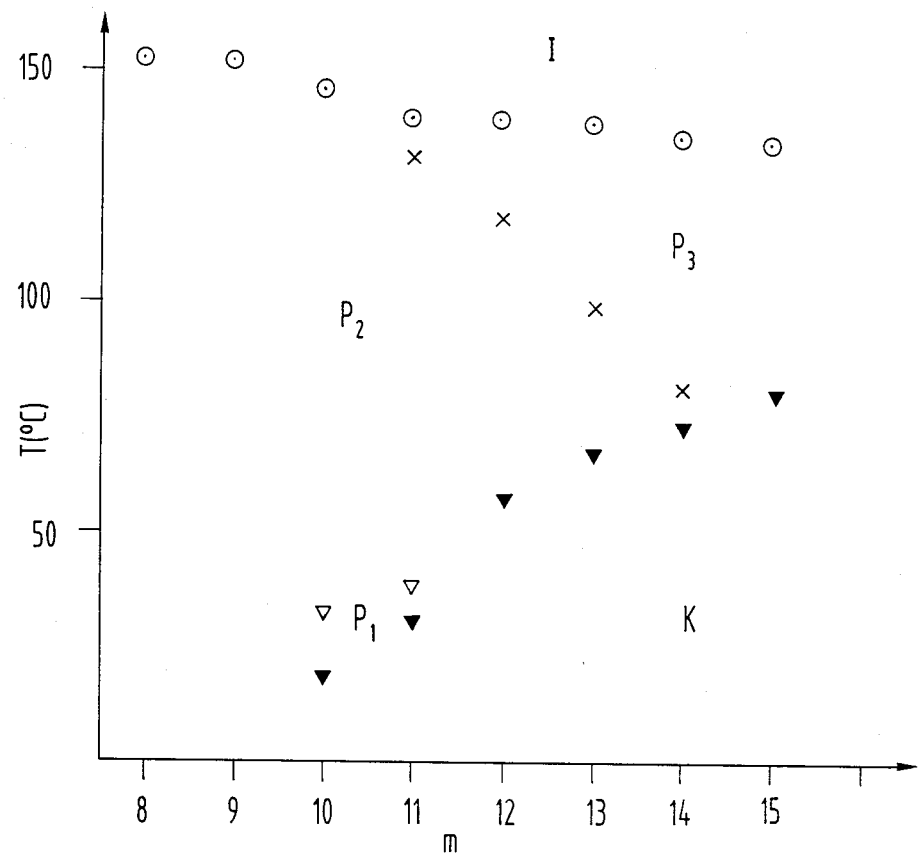
Figure 3:
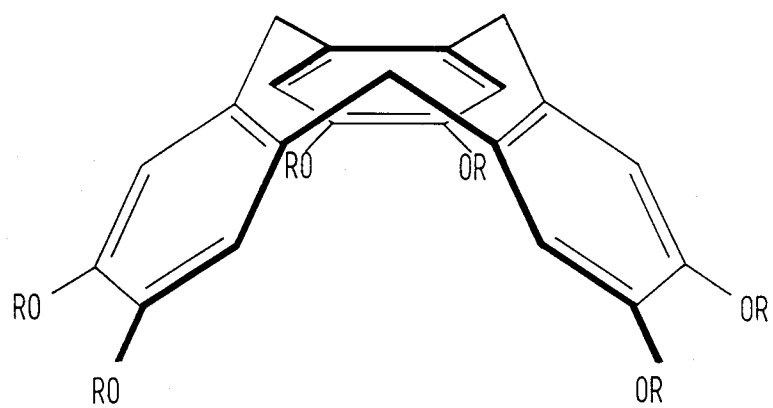
FIG. 3 is the configurational formula for the instant compounds.
Figure 4:
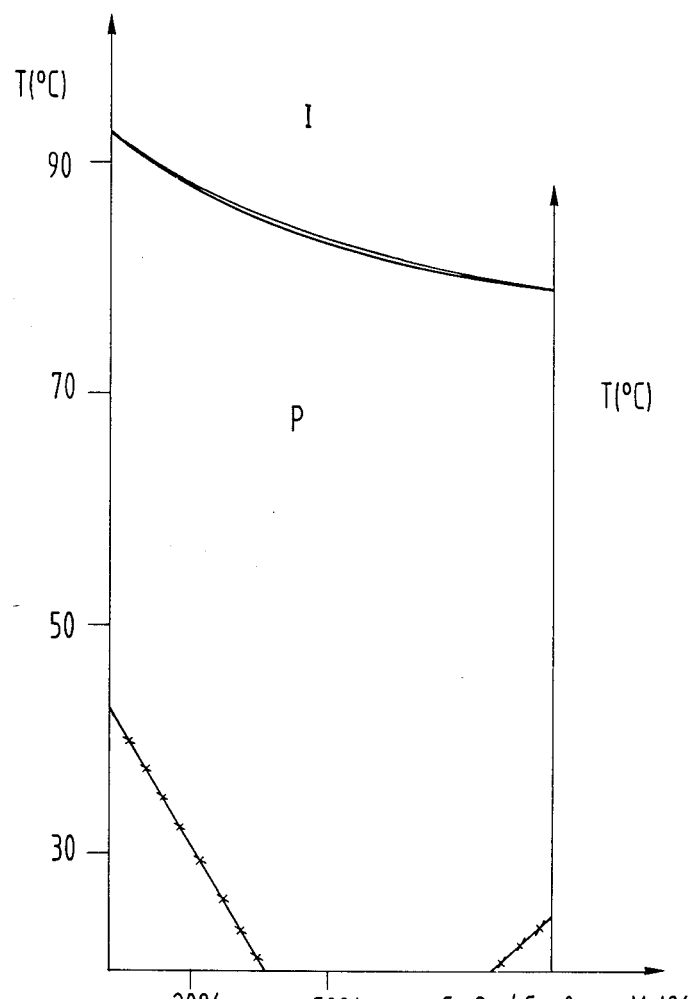
FIGS. 4 through 7 are phase diagrams of various binary mixtures of the instant compounds.
Figure 5:
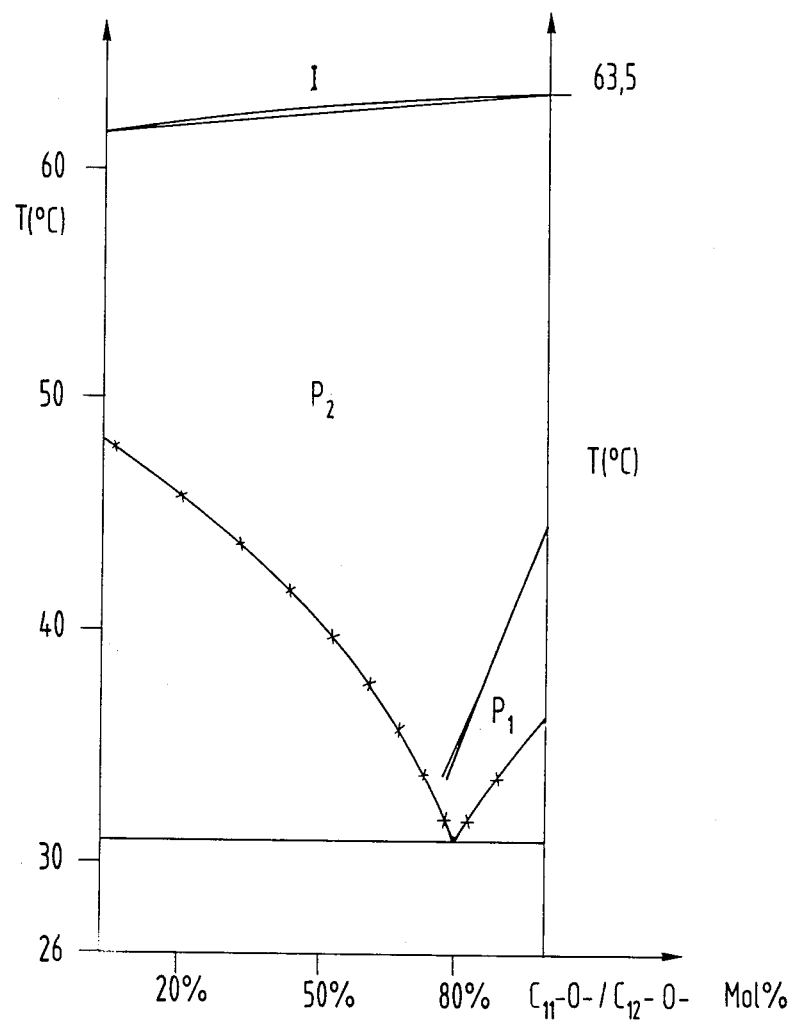
Figure 6:
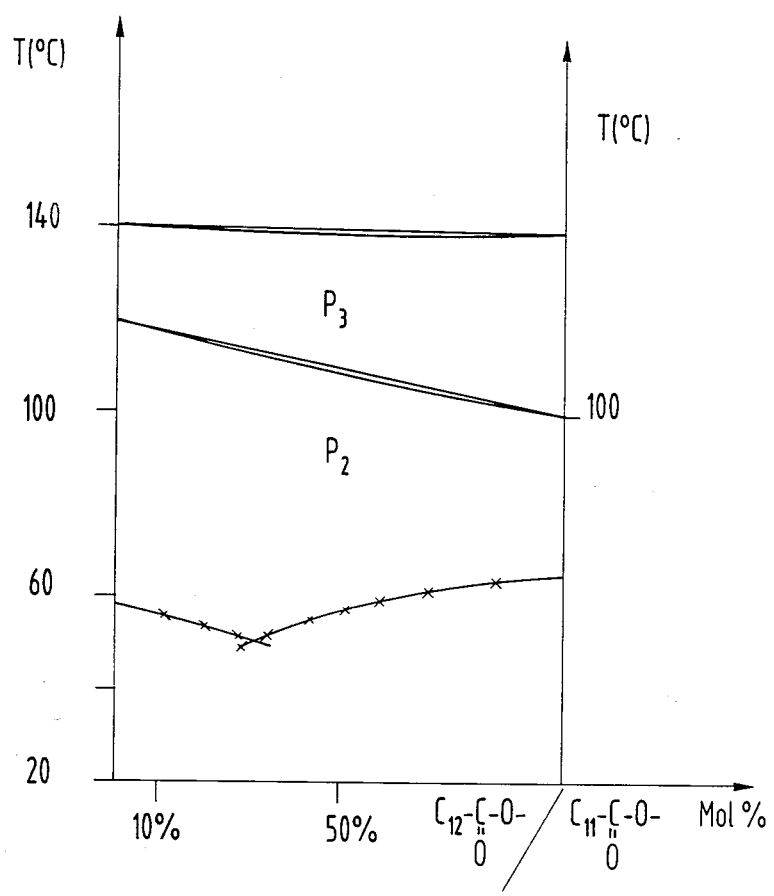
Figure 7:
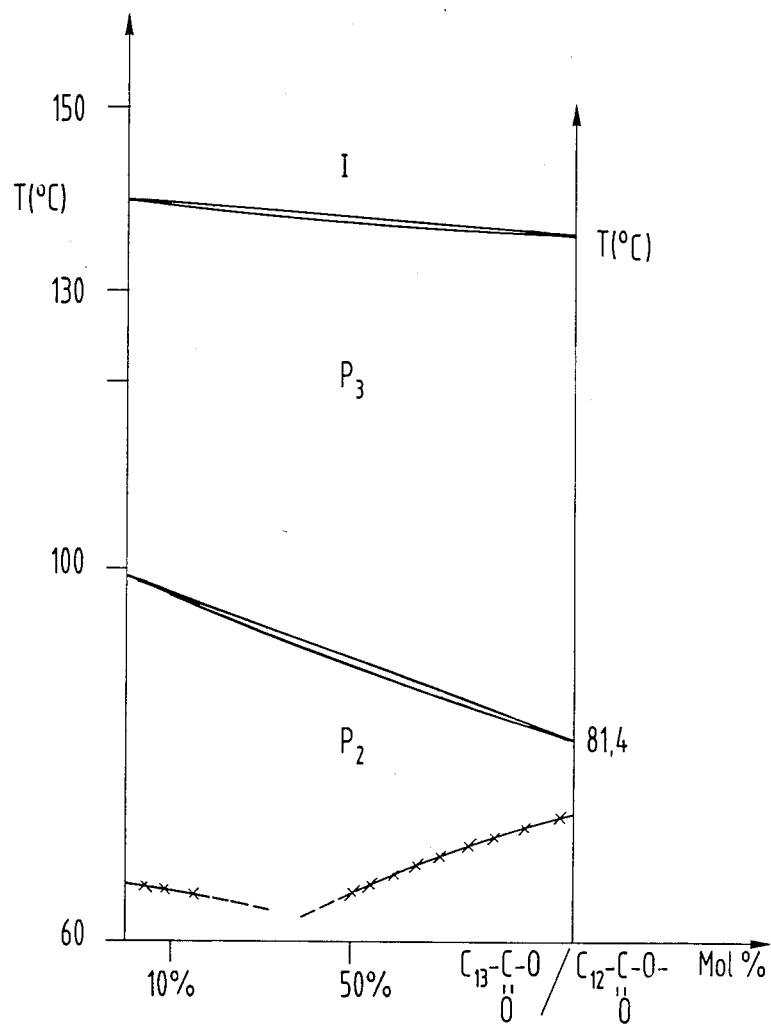

We claim:

1. Hexasubstituted tribenzocyclononatriene derivatives of the general formula I

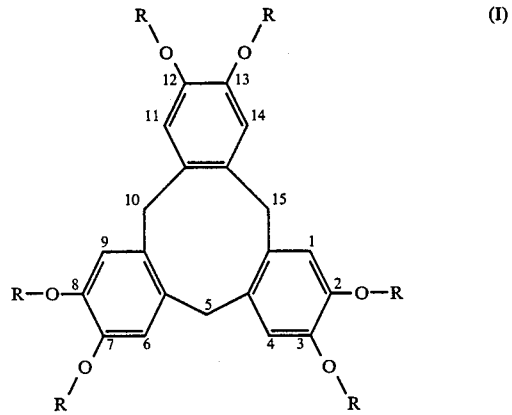

in which the residues R are the same or different and independently from each other represent alkly groups with at least 6 carbon atoms, alkanoyl groups with at least 10 carbon atoms or p-alkylbenzoyl or p-alkoxybenzoyl groups of the formula

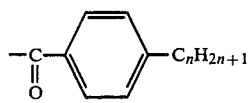

or

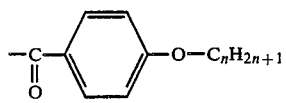

in which n is an integer of at least 5.

2. Compounds according to claim 1, characterized in that the residues R in the general formula I are identical with each other.

3. Compounds according to claim 2, characterized in that the residues R in the general formula I are alkyl groups having 6 to 18 to carbon atoms.

4. Compounds according to claim 2, characterized in that the residues R in the general formula I are alkanoyl groups having 10 to 18 carbon atoms.

5. Compounds according to claim 1, characterized in that n in the alkylbenzoyl or alkoxybenzoyl groups is 5 to 18.

6. A compound according to claim 1 wherein the compound is in liquid crystal form.

7. A compound according to claim 2 wherein the compound is in liquid crystal form.

8. A compound according to claim 3 wherein the compound is in liquid crystal form.

9. A compound according to claim 4 wherein the compound is in liquid crystal form.

10. A compound according to claim 5 wherein the compound is in liquid crystal form.

* * * * *

UNITED STATES PATENT AND TRADEMARK OFFICE
CERTIFICATE OF CORRECTION

PATENT NO. : 4,619,788

DATED : October 28, 1986

INVENTOR(S) : ZIMMERMANN et al.

It is certified that error appears in the above-identified patent and that said Letters Patent is hereby corrected as shown below:

Formula at:

Column 3, line 40

Column 4, line 30

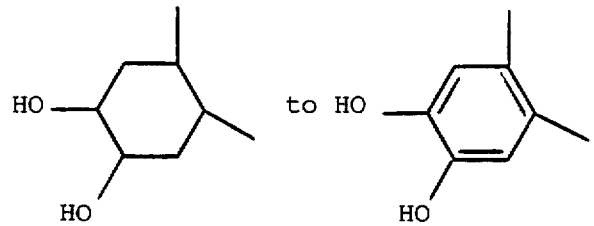

Formula at:

Column 3, line 50

Column 4, line 40

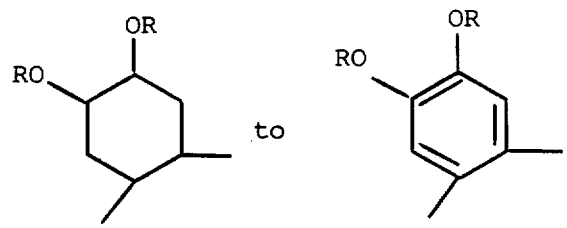

Formula at:

Column 5, line 6

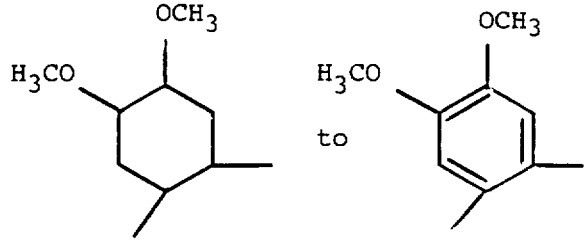

UNITED STATES PATENT AND TRADEMARK OFFICE
CERTIFICATE OF CORRECTION

PATENT NO.   :   4,619,788

DATED        :   October 28, 1986

INVENTOR(S)  :   ZIMMERMANN et al.

Page 2 of 2

It is certified that error appears in the above-identified patent and that said Letters Patent is hereby corrected as shown below:

Formula at:

Column 5, line 25

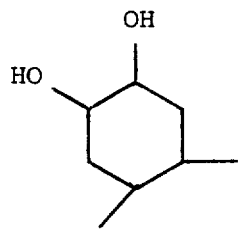  to  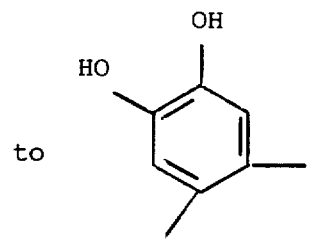

In the Abstract, line 8, replace "basis" by --base--.

Column 1, line 12, replace "basis" by --base--.

Signed and Sealed this

Thirty-first Day of January, 1989

*Attest:*

*Attesting Officer*

DONALD J. QUIGG

*Commissioner of Patents and Trademarks*